(12) United States Patent
Moore

(10) Patent No.: US 7,126,312 B2
(45) Date of Patent: Oct. 24, 2006

(54) METHOD AND APPARATUS FOR BALANCING MULTI-CELL LITHIUM BATTERY SYSTEMS

(75) Inventor: Stephen W. Moore, Fishers, IN (US)

(73) Assignee: Enerdel, Inc., Fort Lauderdale, FL (US)

( * ) Notice: Subject to any disclaimer, the term of this patent is extended or adjusted under 35 U.S.C. 154(b) by 0 days.

(21) Appl. No.: 10/900,502

(22) Filed: Jul. 28, 2004

(65) Prior Publication Data
US 2006/0022639 A1 Feb. 2, 2006

(51) Int. Cl.
H02J 7/04 (2006.01)
(52) U.S. Cl. ...................... 320/157; 320/116
(58) Field of Classification Search ............ 320/116, 320/137, 155, 157, 118, 119, 121, 122; 324/98
See application file for complete search history.

(56) References Cited

U.S. PATENT DOCUMENTS

| | | | | |
|---|---|---|---|---|
| 5,905,360 A | * | 5/1999 | Ukita | .................... 320/118 |
| 5,952,815 A | * | 9/1999 | Rouillard et al. | ............ 320/116 |
| 6,394,208 B1 | * | 5/2002 | Hampo et al. | .............. 180/65.2 |
| 6,812,671 B1 | * | 11/2004 | Formenti et al. | ............ 320/119 |
| 2004/0135548 A1 | * | 7/2004 | Takano et al. | ............... 320/132 |

* cited by examiner

Primary Examiner—Jessica Han
Assistant Examiner—Aaron Piggush
(74) Attorney, Agent, or Firm—Howard & Howard Attorneys, P.C.

(57) ABSTRACT

A method and apparatus of the present invention are designed to equalize cell-to-cell imbalances in a multi-cell lithium battery system. A time-to-balance parameter is calculated for each cell at the beginning of charge, and balancing occurs for each cell having a positive time-to-balance at the beginning of charge. Alternatively, the time-to-balance parameter is calculated during operation of the battery system and equalization of the cells occur in-sit based on the time-to-balance values.

8 Claims, 4 Drawing Sheets

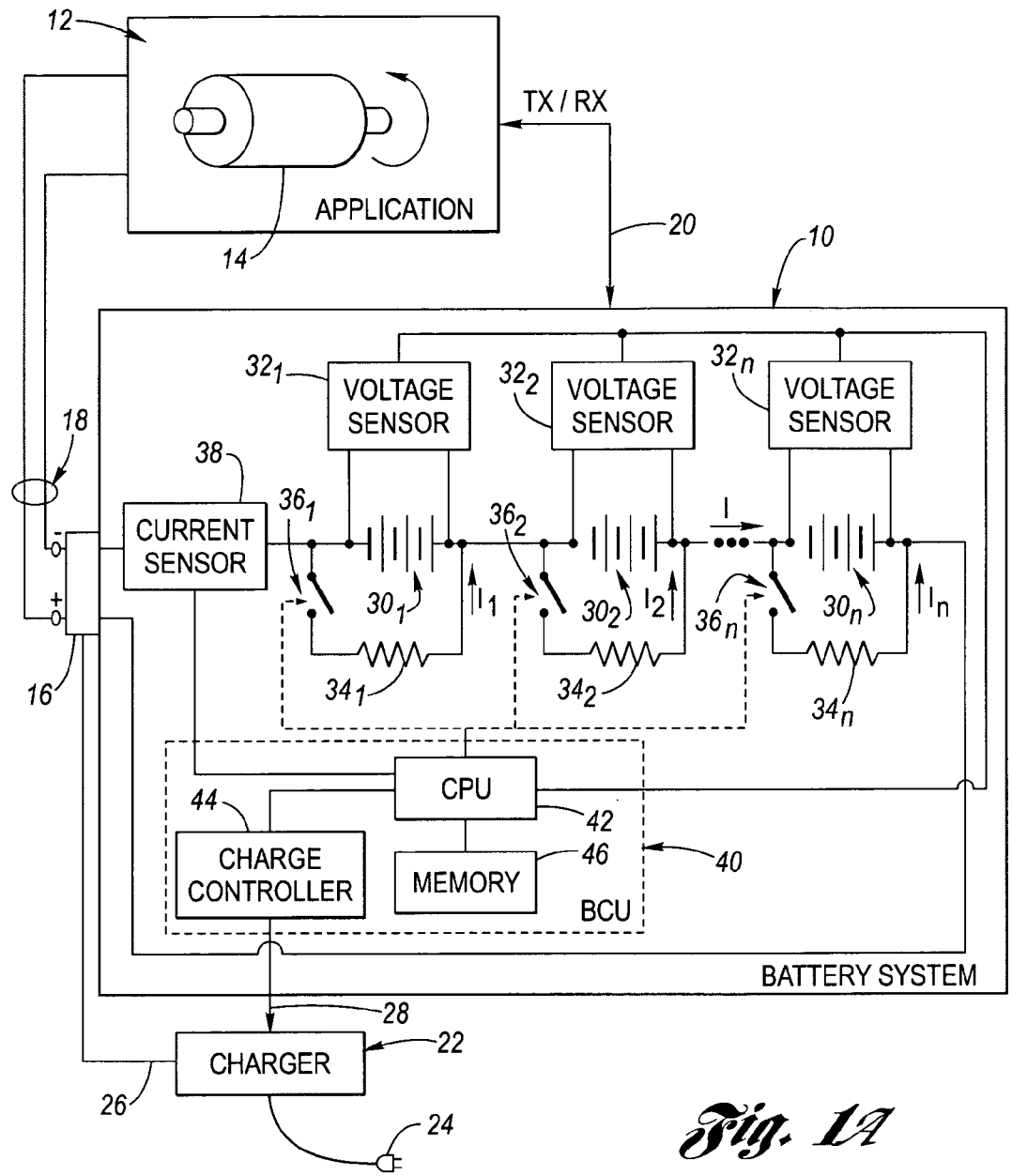
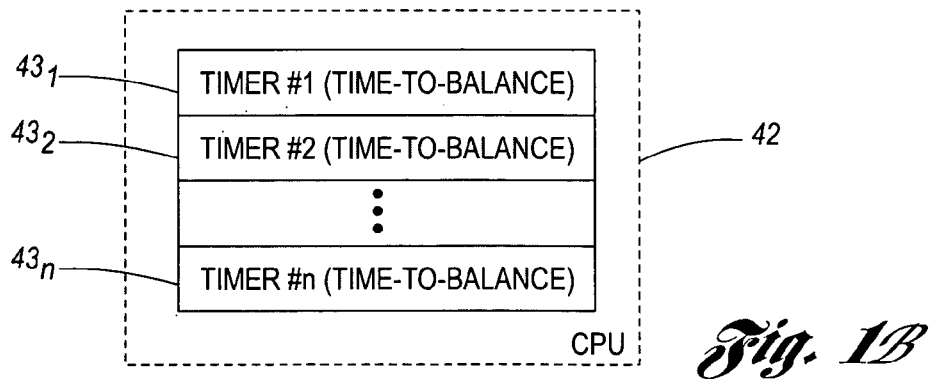
Fig. 1A
Fig. 1B

| CELL | S.O.C. | CAPACITY | REQUIRED CHARGE | DIFFERENCE (REL. TO MAX) | ORDER (EOC) | TIME-TO-BALANCE |
|---|---|---|---|---|---|---|
| $30_1$ | 52% (2.6) | 5.0 | 2.4 $52_{max}$ | 0.0 | nTH | 0 |
| $30_2$ | 60% (3.0) | 5.0 | 2.0 $52_{min}$ | 0.4 | 1ST | $t_5$ |
| $30_3$ | 54% (2.7) | 5.0 | 2.3 | 0.1 | 5TH | $t_1$ |
| $30_4$ | 57% (2.8) | 4.9 | 2.1 | 0.3 | 2ND | $t_4$ |
| $30_5$ | 56% (2.7) | 4.8 | 2.1 | 0.3 | 3RD | $t_3$ |
| ⋮ | ⋮ | ⋮ | ⋮ | ⋮ | ⋮ | ⋮ |
| $30_n$ | 56% (2.8) | 5.0 | 2.2 | 0.2 | 4TH | $t_2$ |

METHOD AND APPARATUS FOR BALANCING MULTI-CELL LITHIUM BATTERY SYSTEMS

BACKGROUND OF THE INVENTION

1. Technical Field

This invention relates generally to multi-cell lithium chemistry battery systems, and, more particularly, to methods and apparatus for balancing such cells.

2. Description of the Related Art

Rechargeable, multi-cell battery systems have been known for decades, and have been based on various chemistries including lead acid (PbA), nickel cadmium (NiCd), nickel metal hydride (NiMH), lithium ion (LiIon) and lithium polymer (LiPo). A key performance aspect of each battery technology relates to how charging (and overcharging) is accomplished, and how inevitable cell imbalances are addressed.

Conventionally, cell-to-cell imbalances in lead-acid batteries, for example, have been solved by controlled overcharging. Lead-acid batteries can be brought into overcharge conditions without permanent cell damage, inasmuch as the excess energy is released by gassing. This gassing mechanism is the natural method for balancing a series string of lead acid battery cells. Other chemistries, such as NiMH, exhibit similar natural cell-to-cell balancing mechanisms.

Lithium ion and lithium polymer battery chemistries, however, cannot be overcharged without damaging the active materials. The electrolyte breakdown voltage is precariously close to the fully charged terminal voltage. Therefore, careful monitoring and controls must be implemented to avoid any single cell from experiencing an over voltage due to excessive charging. Because a lithium battery cannot be overcharged, there is no natural mechanism for cell equalization.

Even greater challenges exist depending on whether the battery system is a single cell or multiple cells. Single lithium-based cells require monitoring so that cell voltage does not exceed predefined limits of the chemistry. Series-connected lithium cells, however, pose a more complex problem; each cell in the string must be monitored and controlled. Even though the system voltage may appear to be within acceptable limits, one cell of the series string may be experiencing damaging voltage due to cell-to-cell imbalances. Based on the foregoing, without more, the maximum usable capacity of the battery system may not be obtained because during charging, an out-of-balance cell may prematurely approach the end of charge voltage and trigger the charger to turn off (i.e., to save that cell from damage due to overcharge as explained above).

One approach taken in the art to address the foregoing problem involves the concept of cell balancing. Cell balancing is useful to control the higher voltage cells until the rest of the cells can catch up. In this way, the charger is not turned off until the cells reach the end-of-charge (EOC) condition more or less together. More specifically, the cells are first charged, and then, during and at the end-of-charging, the cells are balanced.

One example of a cell balancing approach involves energy dissipation. A shunt resistor, for example, may be selectively engaged in parallel with each cell. This approach shunts the excess energy as each cell reaches an end-of-charge condition, resulting in the system becoming more active as the cells reach full charge. During the moments preceding full charge in a system with n total cells, (n−1) cells are dissipating equalization energy as the last cell approaches end-of-charge. This condition results in a buildup of waste energy in the form of heat, which can trigger thermal controls (i.e., discontinuing the charging temporarily until the temperature comes down). These controls extend the overall charge time for the battery system.

Accordingly, there is a need for a method and apparatus for operating a battery system that minimizes or eliminates one or more of the problems as set forth above.

SUMMARY OF THE INVENTION

One advantage of the present invention is that it reduces the amount of time required for charging and balancing of a multi-cell lithium chemistry battery system. Another advantage of the present invention is that reduces the temperature peaks that sometimes occur in conventional systems during balancing, peaks which can cause the balancing cycle to be abated until the temperature has decreased to an acceptable level.

These and other features, advantages, and objects are achieved by a method of operating a battery system in accordance with the present invention.

In a first aspect of the invention, a method is provided for operating a battery system having a charging and balancing cycle with a beginning-of-charge (BOC) time. The battery system has a plurality of cells. The method involves the step of charging the plurality of cells starting at the beginning-of-charge (BOC) time. The method further involves the step of balancing at least a first one of the cells during the above-mentioned charging step based on a balancing parameter predicted for the at least first cell. In one embodiment, the highest charged cells are identified at the beginning-of-charge (BOC) and selectively discharged ("balanced") early during the charging process. This pre-discharge of the highest cells minimizes or eliminates the need to put these cells in an equalization wait state at the end of charge.

In a second aspect of the present invention, a method is provided for operating a battery system having a plurality of cells. The method includes the step of withdrawing power from the cells during an operating cycle. The method further includes the step of identifying at least a first one of the cells at the beginning (or during) the operating cycle that satisfies criteria indicative of excess charge and a desirability for balancing equalizing during a subsequent charging and balancing cycle. Finally, the method involves the step of balancing the identified cell during the operating cycle in advance of the charging and balancing cycle. The identified cell is balanced based on a predicted balancing parameter. In one embodiment, the invention detects cells that will require balancing later on during charging/balancing, and pre-emptively equalizes those cells during the operating cycle, before charging/balancing.

An apparatus according to the invention is also presented.

BRIEF DESCRIPTION OF THE DRAWINGS

The present invention will now be described by way of example, with reference to the accompanying drawings.

FIG. 1A is a simplified schematic and block diagram view of a multi-cell battery system according to the present invention.

FIG. 1B shows an array of timers used to implement balancing schemes according to the invention.

DETAILED DESCRIPTION OF THE PREFERRED EMBODIMENT

Figures 2, 4:
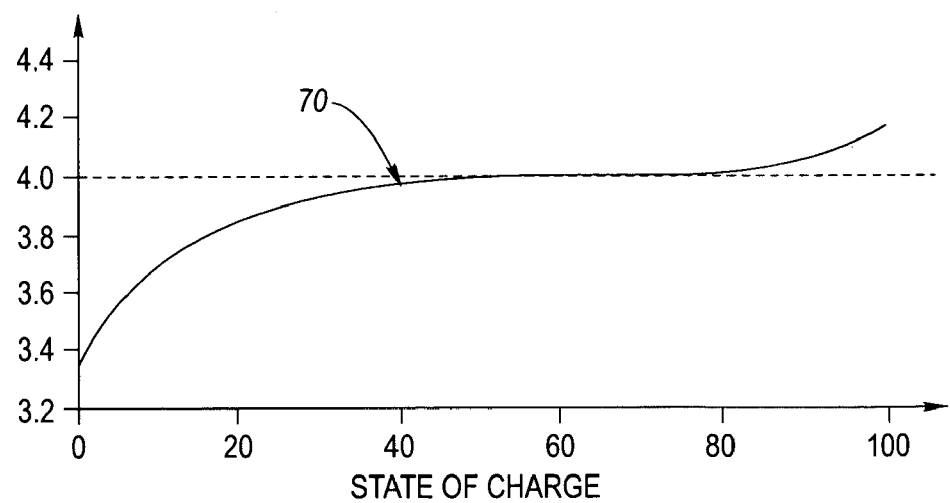
FIG. 2 is a table showing various operating parameters stored in a portion of the memory and used by the battery control unit (BCU) shown in FIG. 1.
FIG. 4 is a simplified Voltage versus State Of Charge (SOC) diagram for an exemplary cell.

Referring now to the drawings wherein like reference numerals are used to identify identical components in the various views, FIG. 1A is a simplified, schematic and block diagram view of an inventive battery system 10 according to the invention suitable for use in connection with any one or more of a plurality of exemplary applications 12. Application 12, in the illustrated embodiment, is of the type that may employ a dynamoelectric machine 14, which may alternatively be configured for operation (i) in a first mode wherein the machine 14 is used for propulsion torque, or (ii) in a second mode different from the first mode wherein the machine 14 is configured for the production of regenerative energy (i.e., it is configured as a generator). For example, such applications may include, but are not limited to, self-propelled vehicle applications, although other application stationary in nature (i.e., rotating systems having loads with inertia) are also included within the spirit and scope of the invention. Dynamoelectric machine 14 may comprise conventional apparatus known to those in the art, for example only, AC or DC electric motors, brush-based or brushless electric motors, electromagnet or permanent magnetic based electric motors, reluctance-based electric motors, or the like. It should be clearly understood that the foregoing is exemplary only and not limiting in nature. Other applications 12 may include more static situations that nonetheless may benefit from a rechargeable battery system 10 in accordance with the present invention.

With continued reference to FIG. 1A, battery system 10 may include an input/output terminal 16. A power bus 18 is configured to allow electrical power to be drawn from battery system 10 when application 12 so requires. If the application 14 is so arranged, power bus 18 may alternatively be configured or used to carry electric energy, herein referred to as regenerative energy, produced by dynamoelectric machine 14 when operated in a regenerative energy production mode (as a generator). As further shown, in the illustrated embodiment, battery system 10 may also include a communications port configured for connection to a communications line 20, designated "TX/RX" (transmit/receive) in FIG. 1A. Communications line 20 may be configured for bi-directional communications, for example, transmission of control signals or control messages, between battery system 10 and application 12, should application 12 be so configured.

FIG. 1A also shows an electrical battery charger 22, including in exemplary fashion a conventional electrical plug 24 for connection to a wall outlet (not shown) or the like. Charger 22 is configured for charging (or recharging) battery system 10. Charger 22 includes a charging power line 26 configured for connection to battery system 10 for charging (or recharging) the battery cells thereof, although for simplicity sake, line 26 is shown connected to the terminal 16. In addition, charger 22 may have an input configured to receive a control signal, such as a charge termination signal, on a control line 28 from battery system 10. The charge termination signal on line 28 is configured to cause charger 22 to discontinue charging battery system 10 (i.e., to stop charging), for example, when the battery system 10 has been charged. Alternatively, charger 22 may be variable charger 22 wherein the control signal on line 28 is operative to adjust the charging current as well as to terminate the charge current. Charger 22 may comprise conventional charging componentry known to those of ordinary skill in the art.

In the illustrated embodiment, battery system 10 includes one or more battery cells $30_1$, $30_2$, ... $30_n$, at least one voltage sensor 32, but preferably a plurality of voltage sensors $32_1$, $32_2$, ... $32_n$, a plurality of balancing resistors $34_1$, $34_2$, ... $34_n$, a corresponding plurality of controlled switches $36_1$, $36_2$, ... $36_n$, at least one current sensor 38 and a battery control unit (BCU) 40. BCU 40 may include a central processing unit (CPU) 42, a charge controller 44, and a memory 46.

Cells $30_1$, $30_2$, ... $30_n$ are configured to produce electrical power, and may be arranged so that the collective output thereof, designated as current I, is provided on I/O terminal 16, as in the illustrated embodiment. Conventional electrical current flows out of terminal 16 to the load (i.e., the application 12). Cells $30_1$, $30_2$, ... $30_n$ are also configured to be rechargeable, for example, by receiving conventional electrical current into battery system 10 at I/O terminal 16. The recharging current may be from either charger 22 or from machine 14 operating as a generator. Cells $30_1$, $30_2$, ... $30_n$ may comprise conventional apparatus according to known battery technologies, such as those described in the Background, for example, various Lithium chemistries known to those of ordinary skill in the energy storage art. In the illustrated embodiment, cells $30_1$, $30_2$, ... $30_n$ are arranged to produce collectively a direct current (DC) output at a predetermined, nominal level (e.g., in a constructed embodiment, 20 cells in series, nominally 4 volts each for a total of 80 volts at 100% of full state of charge).

The plurality of voltage sensors $32_1$, $32_2$, ... $32_n$ are configured to detect a respective voltage level for each cell and produce a corresponding voltage indicative signal representative of the detected voltage. In one embodiment a plurality of voltage sensors 32 are employed, at least one for each individual cell included in battery system 10. In an alternate embodiment, one voltage sensor may be provided in combination with a multiplexing scheme configured to sample the voltage at each cell at predetermined times. This has the same effect as providing multiple sensors 32. Through the foregoing multiple sensor approach, advanced diagnostics and charging strategies may be implemented, as understood by those of ordinary skill in the art, and as will be described in greater detail below. Voltage sensor(s) $32_1$, $32_2$, ... $32_n$ may comprise conventional apparatus known in the art.

Battery system 10 includes apparatus and functionality to implement cell-to-cell charge balancing. In the illustrated embodiment, an energy dissipative structure is shown, and includes a plurality of balancing resistors $34_1$, $34_2$, ... $34_n$ and a corresponding plurality of switches $36_1$, $36_2$, ... $36_n$. The energy dissipative balancing approach selectively shunts selected cells with selected value resistors to remove charge from the highest charged cells until they match the charge on the lowest charged cells. Additionally, other cell balancing approaches are known and which can be used in place of the energy dissipative approach, including but not limited to active charge shunting, and charge shuttling using energy converting devices such as switched transformer, shared transformer, and multiple transformer, as known in the art. In one embodiment, a 40 W balancing resistor is used, which, assuming a nominal cell voltage of about 3.65 V, could achieve a dissipation_rate (expressed in amperes) of about 0.09125 A (about 90 mA).

Current sensor 38 is configured to detect a current level and polarity of the electrical (conventional) current flowing out of (or into) battery system 10 via terminal 16, and generate in response a current indicative signal representative of both level and polarity. Current sensor 38 may comprise conventional apparatus known in the art.

Battery Control Unit (BCU) 40 is configured for controlling the overall operation of battery system 10, including control of the balancing strategies according to the invention. BCU 40 may include a central processing unit (CPU) 42, a plurality of timers $43_1$, $43_2$, ... $43_n$, a charge controller 44, and a memory 46.

CPU 42 may comprise conventional processing apparatus known in the art, capable of executing preprogrammed instructions stored in memory 46, all in accordance with the functionality described in this document that is it is contemplated that the processes described in this application will be programmed, with the resulting software code being stored in memory 46 for execution by CPU 42. Implementation of the present inventive method logic, in software, in view of this enabling document, would require no more than routine application of programming skills. Memory 46 is coupled to CPU 42, and may comprise conventional memory devices, for example, a suitable combination of volatile, and non-volatile memory so that main line software can be stored and yet allow storage and processing of dynamically produced data and/or signals.

FIG. 1B shows an array of timers $43_1$, $43_2$, ... $43_n$, one corresponding to each cell in battery system 10. The timers may be implemented as software timers, or may be hardware (i.e., register-based). Alternatively, timers $43_1$, $43_2$, ... $43_n$ may comprise separate hardware. Timers $43_1$, $43_2$, ... $43_n$ are configured to be loaded with a predictive balancing parameter which in one embodiment is a time-to-balance value associated with the corresponding cell. A more detailed description of how the timers are used will be set forth below.

Charge controller 44 is also coupled to CPU 42, and is configured so as to allow CPU 42 to preset a charge termination voltage, such that when the actual voltage level(s) from sensor(s) $32_1$, $32_2$, ... $32_n$ reach a respective charge termination voltage, controller 44 may generate the above-mentioned charge termination signal on line 28 and/or alternately engage a balancing resistor(s) to shunt/dissipate energy for a particular cell(s). This control signal may be operative to shut down external charger 22, as described above. Charge controller 44 may be configured as a separate unit or circuit, as illustrated, or may be implemented in software executed on CPU 42.

As described in the Background, lithium chemistry batteries are relatively intolerant of overcharging. Accordingly, unless effective cell-to-cell balancing is employed, charging (recharging) would have to be stopped when the strongest cell reaches a maximum charge in order to avoid damage to that cell. This premature stoppage reduces the overall capacity the battery system can provide since the weaker cells in fact take additional charge. A shortcoming of conventional balancing approaches, however, is that is extends the overall time required to charge and balance. In addition, conventional approaches also result in a relatively large dissipation of energy in the form of heat, thereby elevating local temperatures. In extreme cases, threshold temperatures are reached, in which case the charging/balancing is stopped while the battery system is allowed to cool down. This scenario also further extends the overall charging/balancing time.

In a first aspect of the present invention, a method of operating a multi-cell battery system is provided in which the highest charged cells are predicted at the beginning of the charge and balancing cycle rather than at the end as is conventional. Making this determination early (or even at the beginning) of the charging and balancing cycle allows the control established by the present invention to immediately commence dissipation of excess energy in these high charged cells during the charging and balancing cycle. Accordingly, these high charged cells will not have to be placed in an equalization ("balancing") wait state at the end of charge, as is conventional practice. This minimizes or eliminates the waiting time, thereby shortening the overall charging and balancing cycle. Additionally, by starting the dissipation of the excess energy stored in these high charged cells earlier, the overall heat that is dissipated can be spread out over a longer period of time (i.e., the overall charging and balancing time versus during just the balancing time). This may reduce the overall temperature because the heat can dissipate from the battery system to the surrounding environment over greater times, and, reduces or eliminates the possibility of reaching a peak temperature that would require the entire charging/balancing process to be stopped while the battery system is allowed to cool down.

In a second aspect of the present invention, a similar determination as to the identity of high charged cells is made during an operating cycle of the battery system (i.e., identify those cells that will require subsequent balancing). Then, the method proceeds to equalize those high charged cells during the operating cycle of the battery system, before the battery system is placed into a charging and balancing cycle. When charging does begin, the cells are all about equal in charge, and thus the charging can occur in unison, minimizing or eliminating the balancing, reducing the required time.

It should be understood that as used herein, the occurrence of the beginning of charge (BOC) time does not necessarily require that the battery system is completely discharged. In fact, the system may be at or near "full" charge. The beginning of charge (BOC) time is simply the time when charging is to begin (e.g., plugging in the charger).

It should be further understood that as used herein, that the occurrence of the end of charge (EOC) time does not necessarily mean that (i) all of the individual cells are each at 100% state of charge (SOC) or (ii) that all of the cells are charged to an equal SOC level.

For example, in some applications, it is contemplated that regenerative energy will be available to charge the cells. In such applications, a certain amount of headroom is provided so as to allow for the acceptance of this regenerative energy, appreciating that lithium chemistry batteries are intolerant of overcharging as described in the Background. For example, the cells may each be charged to 80% SOC, say, reserving 20% of the total capacity for acceptance of regenerative energy.

The present invention also does not require that all the cells have an equal SOC level at the end of charge (EOC). Under certain circumstances, it may be desirable to set the final state of charge levels differently for each cell, based on each cell's individual characteristics, as set forth in my U.S. copending patent application entitled METHOD FOR CELL BALANCING FOR LITHIUM BATTERIES, U.S. application Ser. No. 10/916,785, filed on Aug. 12, 2004, now pending and incorporated by reference in its entirety.

Figure 3:
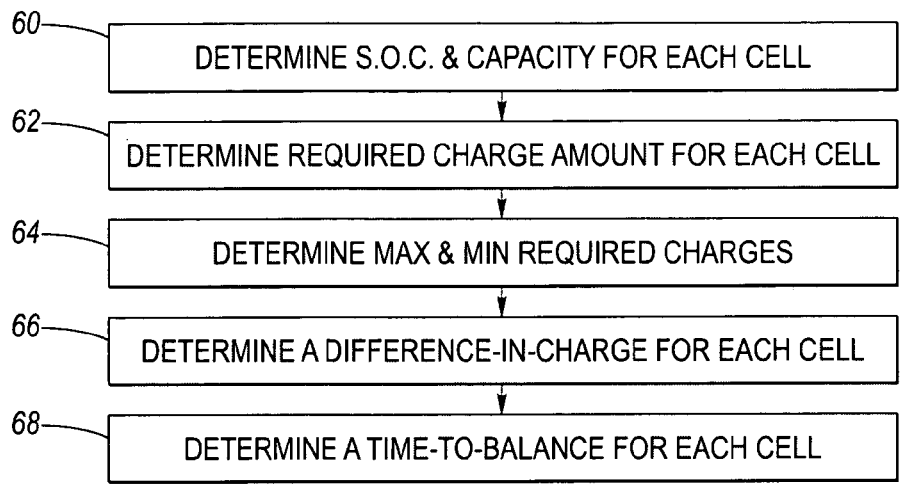
FIG. 3 is a flowchart showing a core process for determining a time-to-balance for each cell for use in predictive and in-situ cell-to-cell equalization.

Referring now to FIGS. 2 and 3, FIG. 2 is a table containing exemplary data used to implement the present invention, and FIG. 3 is flowchart showing the core process for calculating a predictive balancing parameter (e.g., time-to-balance) used in both the first and second aspects of the present invention. Once this description has been made, a detailed explanation of how the predictive balancing parameter may be used will be set forth. The table in FIG. 2 may be implemented as one or more data structures in memory 46, whose contents are available to CPU 42. The table in FIG. 2 includes in a first column which identifies the cell at hand, with additional columns (left-to-right) being populated with data to be described.

In FIG. 2, column 48 contains state of charge (SOC) data for each cell, column 50 contains absolute capacity (e.g., in A-h) information about each cell, column 52 contains the required charge for each cell to reach a fully charged (i.e., end-of-charge (EOC)) state or condition, column 54 contains a difference-in-charge value for each cell, column 56 contains a rank ordering of how each cell would finish charging but for the application of the balancing methods of the present invention, and column 58 contains a time-to-balance value for each cell.

FIG. 3 shows steps 60, 62, 64, 66 and 68 corresponding roughly to a process for populating the table of FIG. 2 with data of the type just described. The text that follows describes the method with ongoing reference to the table of FIG. 2.

FIG. 3 shows step 60, in which the method (i.e., implemented through the programmed operation of BCU 40) is configured to determine a state of charge (SOC) and an absolute capacity for each cell.

The state of charge (SOC) is a parameter indicative of the level of charge of the particular cell itself. In one embodiment, the SOC parameter for a cell may be obtained by knowledge of the open circuit voltage (OCV) measured for the cell. In FIG. 2, column 48 shows a state of charge expressed as both a percentage (%) as well as in arbitrary units of capacity in parentheses for simplicity of description.

FIG. 4 shows an exemplary relationship, trace 70, between the open circuit voltage of a cell 30 and the corresponding state of charge (expressed as a percentage of a maximum SOC for that cell). This approach (i.e., empirical approach) for determining the SOC of a cell is suitable for use in the present invention. It should be understood, however, that there exists other methods known in the art for assessing and determining the state of charge of a rechargeable cell, and such other methods, now known or hereafter developed are expressly considered within the spirit and scope of the present invention.

The absolute capacity is a parameter indicative of the then-prevailing maximum amount of charge that can be stored and recovered from a particular cell. Column 50 in FIG. 2 contains values that are expressed in arbitrary units for clarity, although a common unit of measure for capacity is the ampere-hour (A-h). The absolute capacity of a cell can change over time, due to changes in internal impedance of the cell and due to "aging" (both in the chronological sense as well as with respect to the number of charge/discharge cycles). Assuming for example that 5.0 was the nominal, maximum absolute capacity for all the cells at the time of manufacture, note that in FIG. 2, cells $30_1$, $30_2$, $30_3$ and $30_n$ still have that maximum capacity (@ 5.0), while the absolute capacity for cells $30_4$ and $30_5$ have gone down (@ 4.9 and 4.8, respectively). There are a variety of approaches known in the art for calculating and tracking the absolute capacity of an individual cell of a multi-cell lithium chemistry battery system, and the present invention is not limited to any particular approach. It should be understood that in this regard, the battery control unit (BCU) 40 is preconfigured with known algorithms to provide both (1) state of charge values for the cells and (2) absolute capacity values for the cells.

With continued reference to FIG. 3, the method then proceeds from step 60 to step 62. In step 62, the method (i.e., implemented through the programmed operation of BCU 40) then calculates a required charge amount for each cell. Charge may be stated in units of Ampere-Hours (A-h). This step may be implemented using a simple arithmetic operation as specified in equation (1) below, and assuming there are {11} cells may be calculated for each cell {n}:

$$Ah\_Required\ \{n\}=(1-SOC\{n\})*(Cell\_Capacity\_Ah\ \{n\}) \quad (1)$$

where n is the maximum number of cells in the battery.

Note that in the first aspect of the present invention (i.e., early balancing during charging), the time at which the SOC is determined is at the beginning of charge (BOC). In the second aspect of the present invention (i.e., in-situ balancing during operation), the time at which the SOC is determined may be either (1) in a first embodiment, just before or at the time operation begins; or (2) in a second embodiment, during normal operation when periodic updates by the BCU 40 as to SOC may be available anyway. The required charge amount (column 52 of FIG. 2) is a parameter indicative of an amount of charge required for each one of the cells to reach an end of charge (EOC) condition ("fully" charged), based on the previously determine data contained in column 48 (SOC) and column 50 (absolute capacity).

With continued reference to FIGS. 2 and 3, the method shown in FIG. 3 then proceeds from step 62 to step 64. In step 64, the method (i.e., implemented via programmed operation of BCU 40) determines the cell requiring the most charge to become fully charged ("maximum required charge" or Max_Ah) and the required charge for the cell that requires the least amount of charge to become fully charged ("minimum required charge" or Min_Ah), in accordance with equations (2) and (3) below:

$$Max\_Ah = \max(Ah\_Required\ \{n\}) \quad (2)$$

$$Min\_Ah = \min(Ah\_Required\ \{n\}) \quad (3)$$

where max ( ) is a function that returns the maximum value of all the constituent values in the array, and where min ( ) is a function that returns the minimum value of all the constituent values in the array.

With continued reference to the table in FIG. 2, in column 52, the maximum required charge is enclosed in a dashed-line box and is designated $52_{max}$ while the minimum required charge is also enclosed in a dashed-line box and is designated $52_{min}$. Also note that there is an imbalance between the required charge among all the cells, and while the imbalance is within a range, balancing (or equalization) will be required in order to more fully utilize the capacity of the battery system.

With continued reference to FIGS. 2 and 3, the method shown in FIG. 3 then proceeds from step 64 to step 66. In step 66, the method (i.e., implemented via programmed operation of BCU 40) determines a difference-in-charge for each cell, representative of the difference between the cell that requires the most amount of charge (Max_Ah) and each cell's own required charge amount (as determined by equation (i)), in accordance with equation (4) below:

$$\text{Difference\_Ah } \{n\} = \text{Max\_Ah} - \text{Ah\_Required } \{n\}. \tag{4}$$

The column designated 54 in FIG. 2 contains the difference-in-charge values for all the cells.

With continued reference to FIGS. 2 and 3, the method shown in FIG. 3 then proceeds from step 66 to step 68. In step 68, the method (i.e., implemented via programmed operation of BCU 40) determines a respective time-to-balance for each cell based on the corresponding difference-in-charge, to thereby define a predicted balancing parameter. The time-to-balance is the amount of time each cell $\{n\}$ needs to be subjected to balancing in order to equalize it with the other cells. Note that one cell will require zero balancing time—this is the weakest cell. The weakest cell will be the last cell to reach EOC or become fully charged. The first cell to become fully charged (i.e., but for the present invention) will require the most balancing time. The time-to-balance for each cell may be calculated in accordance with equation (5):

$$\text{Time\_to\_Balance } \{n\} = \text{Difference\_Ah } \{n\} / \text{Dissipation\_Rate} \tag{5}$$

where the Dissipation_Rate is the energy dissipation rate of the balancing circuitry expressed in amperes.

As discussed above, in one embodiment, the balancing resistors $34_1, 34_2, \ldots 34_n$ may each be about 40 W, which would average about 0.09125 mA, assuming a nominal cell voltage of 3.65 volts. The time-to-balance is dependent of the dissipation circuitry.

As shown in FIG. 2, the rank ordering of the cells shows that in the example, cell $30_2$ would be the first to reach EOC (fully charged), and hence requires the most balancing. Cell $30_1$ requires the most charge to reach EOC and is thus the weakest and will be the last of the cells to reach EOC—it will need no balancing time. In between the two cells $30_2$ and $30_1$, each cell will have a respective, calculated time-to-balance, designated in order of the largest time-to-balance to the smallest time-to-balance: $t_5$, $t_4$, $t_3$, $t_2$, and $t_1$ for cells $30_2$, $30_4$, $30_5$, $30_n$, and $30_3$, respectively. The time-to-balance for each cell can be calculated in accordance with the present invention in advance of actual charging, so as to allow predictive balancing (early and during charging) or in advance of actual operation to allow in-situ balancing (during operation).

Predictive Cell Balancing. In the first aspect of the present invention, the foregoing core processes can be used for predictive cell balancing, which can occur simultaneously with charging.

Figure 5:
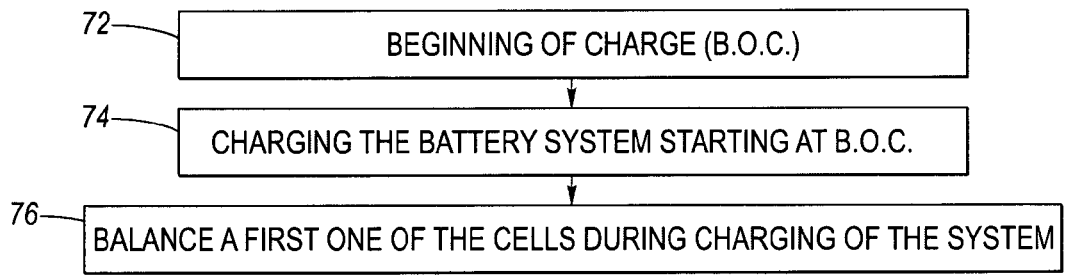
FIG. 5 is a flowchart illustrating a first aspect of the invention for predictive cell-to-cell equalization during a charging and balancing cycle.

FIG. 5 is flowchart of the basic methodology as shown in steps 72, 74 and 76. The method begins in step 72 with the point in time referred to herein as the beginning of charge (BOC). To provide a framework of the relative timing, reference is made to FIG. 6, which is a timing diagram. The two main periods of time for battery system 10 is a so-called operating cycle, designated by reference numeral 78, and a charging and balancing cycle, designated by reference numeral 80. Note, that idle time is not shown in FIG. 6 for clarity. The first aspect of the invention relates to equalization during the charging and balancing cycle 80. The second aspect of the invention to be described below (in-situ equalization) relates to equalization during the operating cycle 78. The charging and balancing cycle 80 has a beginning time called the beginning-of-charge (BOC) 82, and an ending time, called the end-of-charge (EOC) 84. With this frame of reference, the method then proceeds to step 74.

With continued reference to FIG. 5, at the BOC time 82, a time-to-balance value for each cell is calculated, using the processes described above. The time-to-balance values are used to configure respective timers $43_1, 43_2, \ldots 43_n$ in the battery control unit 40 (i.e., these timers are loaded with a respective time-to-balance value). These timers may be software-based timers or they may comprise an array of hardware timers (either imbedded in CPU 42 or as separate hardware components). Either way, in step 74, at the BOC time 82, the charging of the battery system 10 is started. The method then proceeds to step 76.

In step 76, the method involves balancing at least a first cell during the charging of the battery system 10. At the beginning of charge, at least one cell, and preferably all the cells in the group of cells having a positive time-to-balance value (the "balancing group"), will be subjected to balancing. When charging begins, each cell in the balancing group of cells will have its balancing resistor $34_1, 34_2, \ldots 34_n$ engaged through the selective closure of the corresponding switch $36_1, 36_2, \ldots 36_n$, all under the control of BCU 40. Note that at least one cell in battery system 10 will have a zero time-to-balance value under the methodology of the present invention, and will thus not have its associated timer loaded with a positive non-zero value (i.e., will not be balanced). The timers $43_1, 43_2, \ldots 43_n$ are arranged to decrement towards zero, and are started on the occurrence of the BOC time. When a timer associated with a cell decrements to zero, that cell's balancing resistor is turned off by selective opening of the corresponding switch under the control of the BCU 40. Balancing as to that cell stops.

Figure 6:
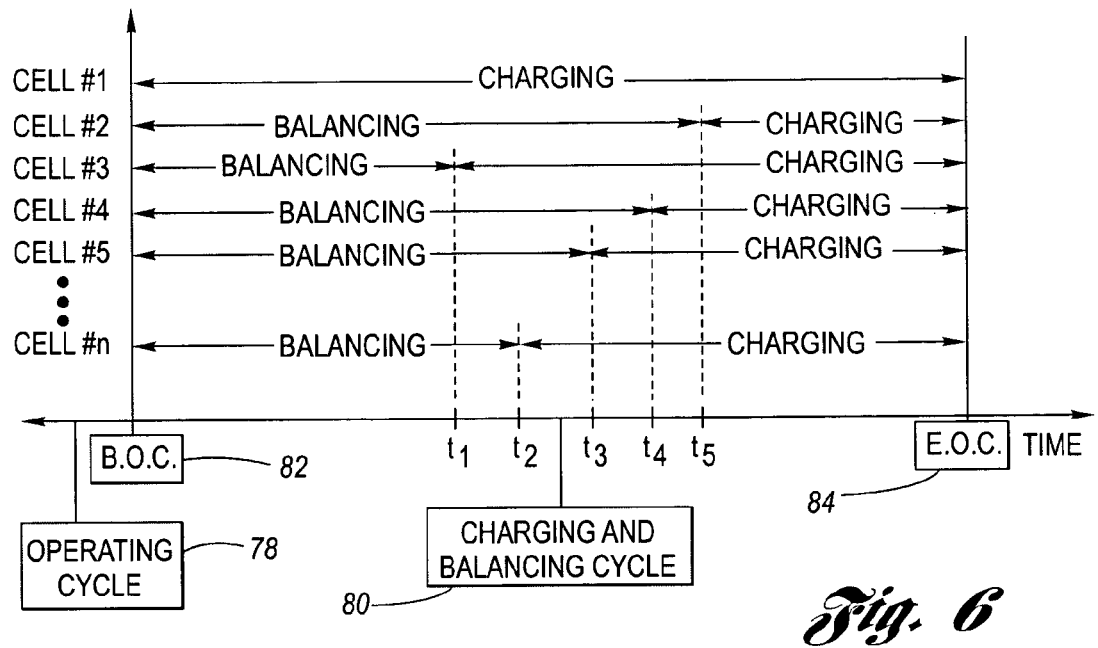
FIG. 6 is a timing diagram showing, in greater detail, one embodiment of the method of FIG. 5.

FIG. 6 illustrates this approach for the exemplary values shown in the chart of FIG. 2. In FIG. 6, note that the weakest cell—cell #1—will be continuously charged throughout the charging and balancing cycle 80. Accordingly, the balancing resistor $34_1$ for cell #1 will not be engaged in this example.

The next weakest cell—cell #3—will need the next greatest amount of charging, and conversely will require the least amount of balancing. Cell #3 will require balancing for a time equal to $t_1$ in FIG. 6, at which time the timer will go to zero and the balancing resistor $34_3$ for cell #3 will be disengaged, and cell #3 will be allowed to charge.

The next weakest cell—cell #n—will have the next greatest amount of charging, and conversely will require the next, least amount of balancing. Cell #n will require balancing for a time equal to $t_2$ in FIG. 6, at which time the timer will go to zero and the balancing resistor $34_n$ for cell #n will be disengaged, and cell #n will be allowed to charge.

The process just described will then be applied to cell #5, cell #4 and cell #2 at times $t_3$, $t_5$ and $t_6$, respectively. After time $t_5$ (i.e., after all the balancing has been completed), all the cells will complete charging together under existing, conventional balancing algorithms.

In an alternative embodiment of this aspect of the invention, to control the level of heat dissipation, only a predetermined number of cells less than all the cells in the group of cells having a positive time-to-balance will be selected for balancing. For example, in an embodiment having twenty (20) cells where one cell is the weakest and the other nineteen (19) cells need to be balanced, only a predetermined number (e.g., eight) having the highest magnitude time-to-balance values will be balanced (i.e., have their balancing resistors engaged). This will reduce the amount of heat dissipated in the balancing resistors, providing the battery system with time to further dissipate the heat to the surrounding environment. The predetermined number of cells may also be selected based on thermal effects expected to arise as consequence of balancing that/those selected cells.

Through the foregoing, as the weakest cell begins to approach EOC, the other cells, now being balanced, will be very nearly equal in charge, thereby minimizing or eliminating the final balancing. Also, since the balancing, which involves dissipation of excess energy in the form of heat, is conducted over a longer period of time, thermal shut-down conditions due to elevated temperatures can be avoided (e.g., conventionally charging to balancing time may be in a 3:1 ratio).

In-Situ Equalization. In the second aspect of the present invention, the core method (FIG. 3) of calculating time-to-balance values can be used for in-situ equalization (i.e., balancing during operation).

Figure 7:
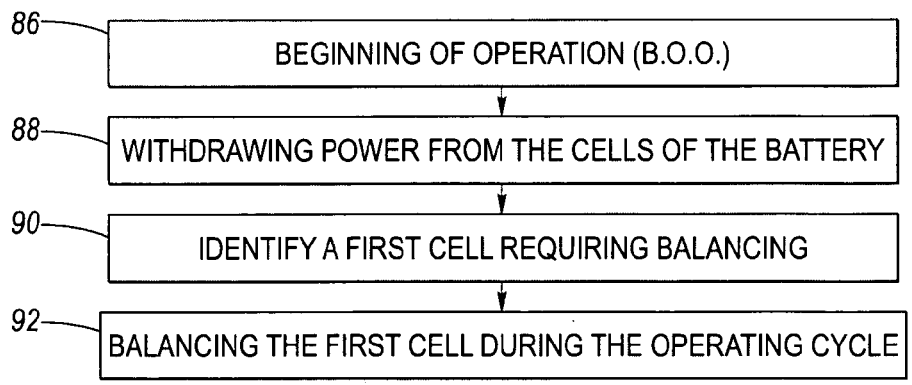
FIG. 7 is a flowchart illustrating a second aspect of the invention for in-situ cell-to-cell equalization during an operating cycle.

FIG. 7 is a flowchart of the basic methodology as shown in steps 86, 88, 90 and 92. The method begins in step 86 with the beginning of operation (BOO), designated by reference numeral 94 in FIG. 8. As described above, the two main periods of time for battery system 10 is a so-called operating cycle 78 and a charging and balancing cycle 80 (idle time not shown). The second aspect of the invention relates to balancing in the operating cycle 78. The method then proceeds to step 88.

In step 88, the application 12 is operative to withdraw power from the battery system 10 (i.e., from the cells 30). This defines is the operating cycle 78. The method then proceeds to step 90.

In step 90, the method involves identifying at least a first cell for balancing. In one embodiment, this step is performed at the beginning of the operating cycle (BOO). The method accomplishes this identification by executing the core algorithm described above in connection with FIG. 3 for determining respective time-to-balance values for the cells. In an alternate embodiment, the time-to-balance values are updated after the beginning of the operating cycle, for example, when updated estimates of the SOC for each cell become available from BCU 40 through its normal operating control of battery system 10. Now having the time-to-balance values, the method then proceeds to step 92.

In step 92, the method involves the step of balancing the identified cell(s). This step is performed the same way as described above in connection with FIG. 56, using timers, switches and balancing resistors.

Figure 8:
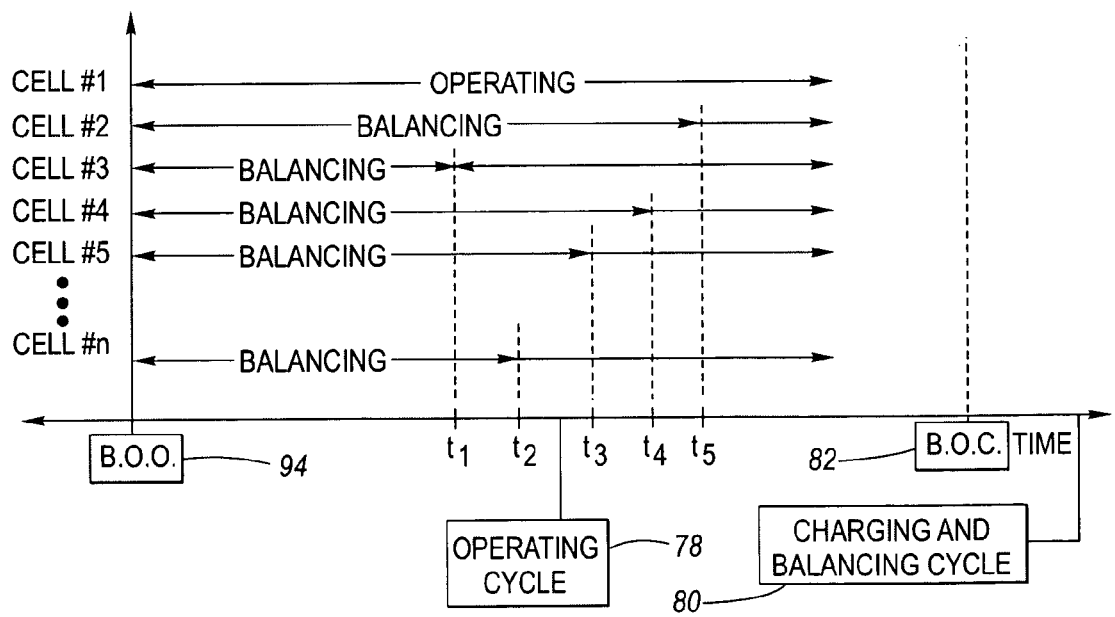
FIG. 8 is a timing diagram showing, in greater detail, one embodiment of the method of FIG. 7.

FIG. 8 illustrates in-situ equalization for the exemplary values shown in the table of FIG. 2. In FIG. 8, note that the weakest cell—cell #1—will continuously supply power to the load throughout and during the operating cycle 78 without shunting current. Accordingly, the balancing resistor $34_1$ for cell #1 will not be engaged in this example.

The next weakest cell—cell #3—will require the least amount of balancing. Cell #3 will require balancing for a time equal to $t_1$ in FIG. 8, at which time the timer will go to zero and the balancing resistor $34_3$ for cell #3 will be disengaged, and cell #3 will be allowed to provide power without shunting of current.

The next weakest cell—cell #n—will require the next least amount of balancing. Cell #n will require balancing for a time equal to $t_2$ in FIG. 8, at which time its timer will go to zero and the balancing resistor $34_n$ for cell #n will be disengaged, and cell #n will be allowed to provide power without shunting current.

The process just described will then be applied to cell #5, cell #4 and cell #2 at times $t_3$, $t_5$ and $t_6$, respectively. After time $t_5$ (i.e., after all the balancing has been completed), all the cells will allowed to provide power in unison without any shunting of current (i.e., balancing). At this point, each cell 30 will require the same amount of charge to reach a fully charged state. Thus, when the charging and balancing cycle 80 actually does start, the amount of time spent equalizing cell-to-cell charges will be minimized or eliminated.

As in the first aspect of the invention described above, in a still further alternate embodiment, to control the level of heat dissipation, only a predetermined number of cells less than all the cells in the group of cells having a positive time-to-balance value may be selected for balancing. For example, in an embodiment having twenty (20) cells where one cell is the weakest and the other nineteen (19) cells need to be balanced, only a predetermined number (e.g., eight) having the highest magnitude time-to-balance values will be balanced (i.e., have their balancing resistors engaged). This will reduce the amount of heat dissipated in the balancing resistors, providing the battery system 10 with time to further dissipate the heat to the surrounding environment.

It should be understood that the foregoing is exemplary rather than limiting in nature. Alternatives and variations are possible and yet remain within the spirit and scope of the present invention.

The invention claimed is:

1. A method of operating a battery system having a charging and balancing cycle with a beginning-of-charge (BOC) time, the system having a plurality of cells, said method comprising the steps of:

charging the plurality of cells staffing at the beginning-of-charge (BOC) time;

balancing at least a first one of the plurality of cells during said charging step based on a predicted balancing parameter determined for the at least first cell;

determining, for each one of the cells, a respective required charge amount indicative of an amount of charge required to reach an end-of-charge (EOC) state;

calculating a maximum required charge from the required charge amounts determined for the cells;

determining a difference-in-charge for each cell representative of the difference between the maximum required charge and the respective required charge amount determined for each cell;

determining a respective time-to-balance for each cell based on the corresponding difference-in-charge to thereby define the predicted balancing parameter;

said balancing step is performed for the determined time-to-balance associated with the at least first one cell;

said balancing step is performed for additional cells from the group of cells having a positive time-to-balance, said balancing step enduring for each additional cell for a time corresponding to the respective time-to-balance; and said balancing step starts at the beginning-of-charge (BOC) time for a subset of cells less than all of the cells in the group having a positive time-to-balance.

2. The method of claim 1 further including the step of: selecting cells for inclusion in the subset from the group of all cells having a positive time-to-balance based on the magnitude of the time-to-balance associated with the cell.

3. The method of claim 2 wherein said selecting step is performed further based on predetermined temperature criteria.

4. The method of claim 2 further including the step of: selecting, from the group of all cells having a positive time-to-balance, a predetermined number of cells for inclusion in the subset having a respective time-to-balance that have the highest values.

5. A method of operating a battery system having a plurality of cells, said method comprising the steps of:
   withdrawing power from the cells of the battery system during an operating cycle thereof;
   identifying at least a first one of the plurality of cells during the operating cycle that satisfy predetermined criteria indicative of expected excess charge during a subsequent charging and balancing cycle;
   balancing the identified at least first cell during the operating cycle in advance of the charging and balancing cycle;
   determining, for each one of the plurality of cells, a respective required charge amount indicative of an amount of charge required to reach an end-of-charge (EOC) state;
   calculating a maximum required charge from the required charge amounts determined for the cells;
   determining a difference-in-charge for each cell representative of the difference between the maximum required charge and the respective required charge amount determined for each cell;
   determining a time-to-balance for each cell based on the respective difference-in-charge; and selecting the at least first cell for balancing from a group cells having a positive time-to-balance;
   said balancing step starts at the beginning of the operating cycle for all cells of the group having a positive time-to-balance; and
   said balancing step starts at the beginning of the operating cycle for a subset of cells less than all of the cells in the group having a positive time-to-balance.

6. The method of claim 5 further including the step of: selecting cells for inclusion in the subset from the group of all cells having a positive time-to-balance based on the magnitude of the time-to-balance associated with the cells.

7. The method of claim 6 wherein said selecting step is performed further based on predetermined temperature criteria.

8. The method of claim 5 further including the step of: selecting for inclusion in the subset, from the group of all cells having a positive time-to-balance, a predetermined number of cells having a respective time-to-balance that have the highest values.

* * * * *